(12) United States Patent
Lee et al.

(10) Patent No.: US 6,526,959 B1
(45) Date of Patent: Mar. 4, 2003

(54) ADHESIVE SHEET FOR NOISE AND SHOCK ABSORPTION, AND SAW BLADE MAKING USE OF IT, AND MANUFACTURING METHODS THEREFOR

(75) Inventors: Chang Hyun Lee, Kyongki-Do (KR); Hyun Seok Choi, Kyongki-Do (KR)

(73) Assignee: Ehwa Diamond Ind. Co., Ltd. (KR)

( * ) Notice: Subject to any disclaimer, the term of this patent is extended or adjusted under 35 U.S.C. 154(b) by 0 days.

(21) Appl. No.: 09/464,336

(22) Filed: Dec. 15, 1999

(30) Foreign Application Priority Data

Sep. 28, 1999 (KR) .............................. 99-41609

(51) Int. Cl.$^7$ .............................................. B28D 1/04
(52) U.S. Cl. ........................................ 125/15; 125/12
(58) Field of Search ............................. 125/15, 19, 22; 76/112

(56) References Cited

U.S. PATENT DOCUMENTS

| | | | | |
|---|---|---|---|---|
| 3,812,755 A | * | 5/1974 | Danielsen | 83/835 |
| 3,990,338 A | * | 11/1976 | Wikner et al. | 83/835 |
| 4,006,999 A | | 2/1977 | Brantley et al. | |
| 4,106,382 A | * | 8/1978 | Salje et al. | 83/835 |
| 4,175,912 A | | 11/1979 | Crane et al. | |
| 4,187,754 A | * | 2/1980 | Beaty | 83/847 |
| 4,867,025 A | * | 9/1989 | Eklof et al. | 83/835 |

\* cited by examiner

*Primary Examiner*—George Nguyen
*Assistant Examiner*—Dung Van Nguyen
(74) *Attorney, Agent, or Firm*—Vidas, Arrett & Steinkraus PA

(57) ABSTRACT

An adhesive sheet for noise and shock absorption and a saw blade making use of it and manufacturing methods therefor for use in joining components of a cutting or grinding apparatus to generate vibrations and noises such as a cutting saw machine for a grinding or cutting material such as brick, concrete, granite, marble, etc. The adhesive sheet according to the present invention is composed of a resin adhesive such as denaturalized epoxy resin, phenol resin, rubber, or compound composition thereof etc., and a noise and shock absorption material infiltrated with the resin adhesive, and fabricated by infiltrating the noise and shock absorption material such as non-woven fabric, paper, or textiles with the resin adhesive such as denaturalized epoxy resin, phenol resin, rubber, or compound composition thereof etc., and drying the infiltrated noise and shock absorption material at a predetermined temperature for several minutes and hardening it by half.

The saw blade for use in the cutting or grinding apparatus of the present invention is composed of a wheel body for connecting with a shaft of an electric motor having upper and lower wheel portions, and an adhesive sheet layer including a noise and shock absorption material disposed between upper and lower wheel portions of the wheel body, and fabricated by positioning the adhesive sheet for noise and shock absorption between upper and lower wheel portions of the wheel body, and hardening wheel portions and the adhesive sheet therebetween at a predetermined temperature and pressure for given times.

6 Claims, 4 Drawing Sheets

ADHESIVE SHEET FOR NOISE AND SHOCK ABSORPTION, AND SAW BLADE MAKING USE OF IT, AND MANUFACTURING METHODS THEREFOR

BACKGROUND OF THE INVENTION

The present invention relates to an adhesive sheet for noise and shock absorption and a saw blade making use of it and manufacturing methods therefor for use in joining components of a cutting or grinding apparatus to generate vibrations and noises such as a cutting saw machine for a grinding or cutting material such as brick, concrete, granite, marble, etc. More particularly, the present invention relates to an adhesive sheet for noise and shock absorption and a saw blade making use of it and manufacturing methods therefor for use in adhering upper and lower wheel portions of a saw blade of a cutting saw machine to reduce noises and absorb shocks or vibrations generated between the saw blade and a material to be cut during cutting or grinding operation and thereby to enhance cutting ability and life of the blade.

A conventional diamond saw blade for use in a cutting saw machine comprises a steel wheel body for connecting with a shaft of an electric motor having upper and lower wheel discs, and a cutting tip fixedly attached on the circumference of the steel wheel body and made of diamond, a grinding material, metals such as cobalt, nickel, bronze, copper, etc., and resin or ceramic.

The steel wheel body includes a thin plate made of metals such as copper disposed between the upper and lower wheel discs to absorb noises and vibrations during cutting or grinding operation.

However, in this blade, since joining between the thin metal plate and the upper and lower wheel discs was carried out by means of spot welding, the manufacturing process was complicated and troublesome. Also, since noises and shocks were absorbed by the thin metal plate, it was difficult to obtain satisfactory noise and shock absorbing effects.

To improve these problems, there has been proposed a method joining upper and lower wheel discs by means of a liquid resin adhesive or a film type adhesive.

However, in case of the method by the liquid resin adhesive, there were problems difficult to infuse or put in the resin adhesive just as much as amount required to join upper and lower wheel discs and maintain uniformly the adhesion thickness between upper and lower wheel discs as a whole, and in case of the method by the film type adhesive, there were problems that work was very difficult and troublesome and the film type adhesive was high-priced.

Also, since in all above noted two methods, noise and shock absorption effects were obtained by a resin adhesive layer having a simple structure, it was difficult to improve noise and shock absorbing effects to a satisfactory level.

SUMMARY OF THE INVENTION

It is the first object of the present invention to provide a low-priced adhesive sheet having excellent noise and shock absorption effects and manufacturing methods therefor for use in joining components of a cutting or grinding apparatus to generate vibrations and noises such as a cutting saw machine, including a noise and shock absorption material to reduce noises and absorb shocks or vibrations.

It is the second object of the present invention to provide a saw blade and manufacturing methods therefor for use in a cutting or grinding apparatus to generate vibrations and noises such as a cutting saw machine, including an adhesive sheet layer for noise and shock absorption which is able to reduce noises and absorb shocks or vibrations generated between the saw blade and the material to be cut during cutting or grinding operation and thereby to enhance cutting ability and life of the blade, and whose manufacturing process is able to be easily automated to reduce manufacturing cost of the blade.

To accomplish the first object, the adhesive sheet for noise and shock absorption according to the present invention comprises at least one resin selected from group consisting of denaturalized epoxy resin, phenol resin, rubber, etc. hardened by half, and a noise and shock absorption material infiltrated with the selected resin. The noise and shock absorption material is composed of the carrier such as non-woven fabric, paper, or textiles as well as adhesive resin.

The method for manufacturing the adhesive sheet for noise and shock absorption according to the present invention comprises steps of infiltrating a noise and shock absorption material with at least one resin selected from group consisting of denaturalized epoxy resin, phenol resin, rubber, etc., and drying the infiltrated noise and shock absorption material at a predetermined temperature for several minutes and hardening it by half. It is desirable that the drying and hardening step is carried out by a hot wind.

To accomplish the second object, the saw blade for use in the cutting or grinding apparatus according to the present invention comprises a wheel body for connecting with a shaft of an electric motor having at least two wheel portions, and at least one adhesive sheet layer including at least one resin selected from group consisting of denaturalized epoxy resin, phenol resin, rubber, etc. and a noise and shock absorption material disposed between the wheel portions of the wheel body. In this blade, the noise and shock absorption material is composed of non-woven fabric, paper, or textiles.

The method for manufacturing a saw blade for use in the cutting or grinding apparatus according to the present invention comprises steps of positioning at least one adhesive sheet for noise and shock absorption comprising at least one resin selected from group consisting of denaturalized epoxy resin, phenol resin, rubber, etc. and a noise and shock absorption material between at least two wheel portions of a wheel body, and hardening the wheel portions and the adhesive sheet therebetween at a predetermined temperature and pressure for given times. The hardening step is carried out by means of heat press and heating oven.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Figure 1:
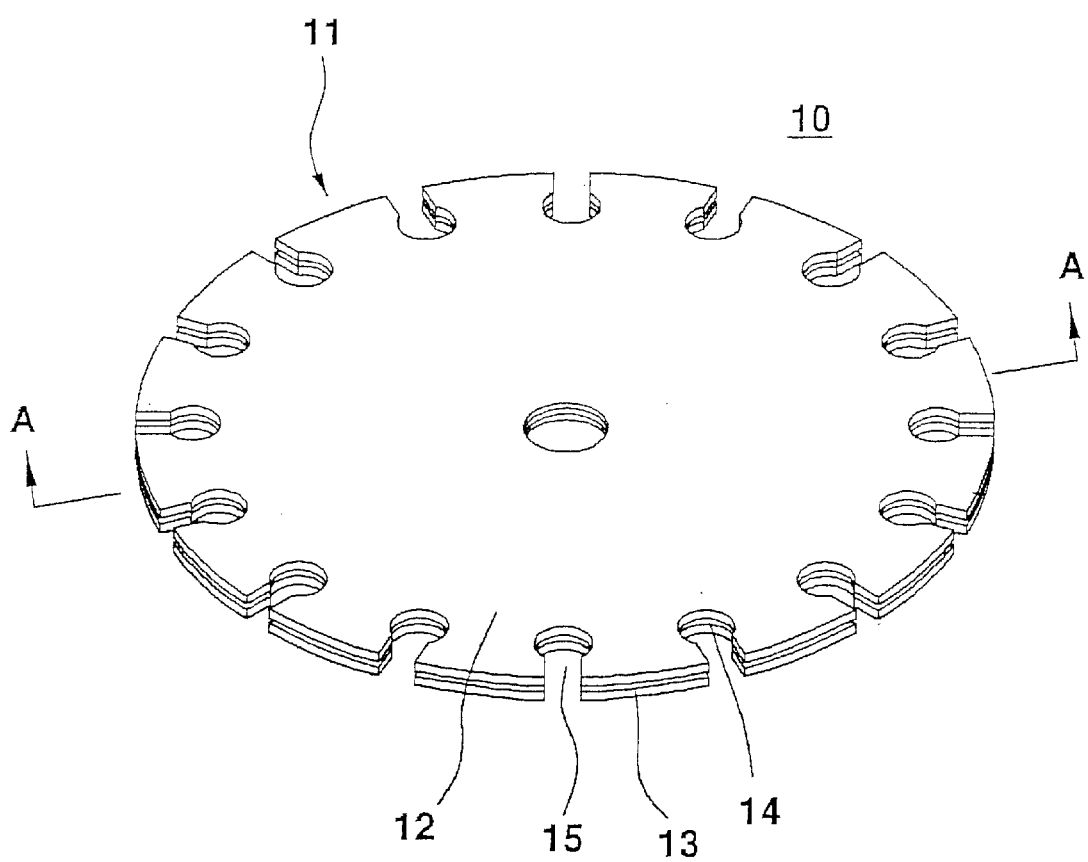
FIG. 1 is a perspective view of a saw blade according to the present invention.
Figure 2:
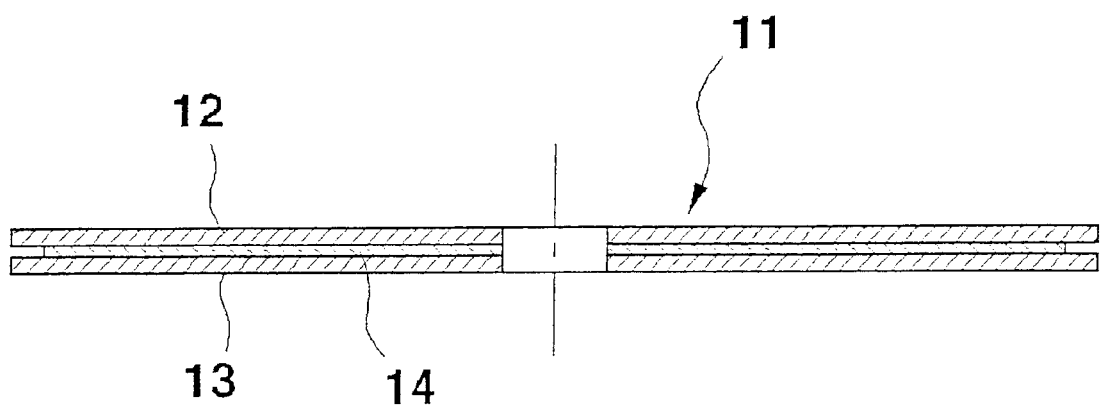
FIG. 2 is a cross-sectional view of the saw blade of the present invention taken along line A—A of FIG. 1.
Figure 3:
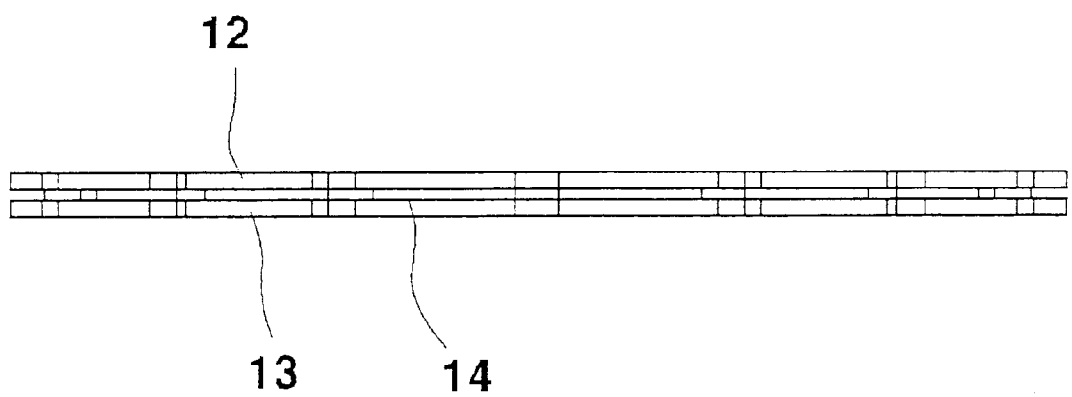
FIG. 3 is a side view of the saw blade of the present invention shown in FIG. 1.
Figure 4:
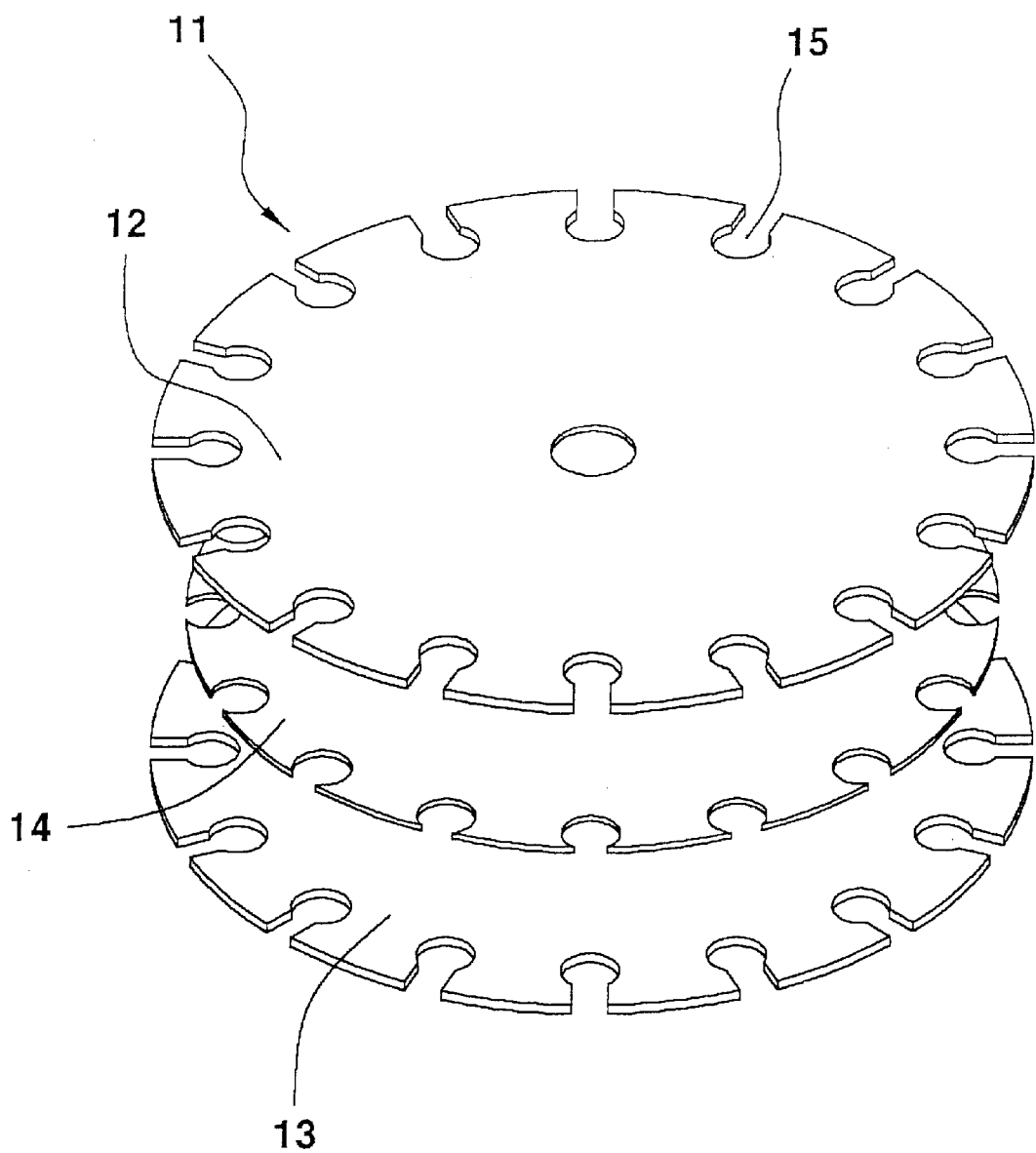
FIG. 4 is a perspective view of parts of the saw blade of the present invention shown in FIG. 1.

Now, an embodiment of the present invention will be described with reference to FIG. 1 to FIG. 4 which same components are illustrated and shown as same numerals.

1. ADHESIVE SHEET

An adhesive sheet for noise and shock absorption for use in joining components of a cutting or grinding apparatus according to the present invention comprises a resin adhesive such as denaturalized epoxy resin, phenol resin, rubber, or compound composition thereof etc., and a noise and shock absorption material infiltrated with the resin adhesive.

The resin adhesive is in a state hardened by half and the noise and shock absorption material is composed of at least one sheet of non-woven fabric, paper, or textiles having thickness of about 0.01–1 mm.

An adhesive sheet for noise and shock absorption according to the present invention is fabricated by infiltrating a noise and shock absorption material such as non-woven fabric, paper, or textiles having thickness of about 0.01–1 mm with the resin adhesive such as denaturalized epoxy resin, phenol resin, rubber, or compound composition thereof etc., and drying the infiltrated noise and shock absorption material for several minutes and hardening it by half by means of a hot wind.

2. SAW BLADE

As shown in FIG. 1 to FIG. 4, the saw blade 10 for use in a cutting or grinding apparatus according to the present invention comprises the wheel body 11 for connecting with a shaft of an electric motor having upper and lower wheel portions 12 and 13 including slot holes 15 for receiving and discharging cutting particles generated during cutting or grinding operation, and an adhesive sheet layer 14 including at least one resin selected from group consisting of denaturalized epoxy resin, phenol resin, rubber, or compound composition thereof etc. and a noise and shock absorption material disposed between upper and lower wheel portions 12 and 13 of the wheel body 11. In this blade 10, it is desirable that the noise and shock absorption material is composed of at least one sheet of non-woven fabric, paper, or textiles having thickness of about 0.01–1 mm.

The saw blade 10 of the present invention is fabricated by positioning the adhesive sheet for noise and shock absorption comprising denaturalized epoxy resin, phenol resin, rubber, or compound composition thereof etc. and the noise and shock absorption material such as non-woven fabric, paper, or textiles between upper and lower wheel portions 12 and 13 of the wheel body 11, and hardening wheel portions 12 and 13 and the adhesive sheet therebetween. The hardening process is carried out by means of heat press and heating oven.

The saw blade 10 fabricated as noted above has favorable shearing adhesive force comparing with that of a conventional saw blade having thin copper plate.

Further, by using of the noise and shock absorption material having given thickness, adhesive thickness in the saw blade 10 of the invention is maintained uniformly as a whole.

Also, since the adhesive sheet layer 14 between upper and lower wheel portions 12 and 13 of the invention has a composite structure comprising the resin adhesive and the noise and shock absorption material such as non-woven fabric, paper, or textiles, the noise and shock absorption effect of the saw blade 10 of the invention is superior to that of a conventional saw blade including a thin copper plate or film type adhesive.

For example, in case of a saw blade having a diameter of 9" (inches), intensity of sound of the conventional saw blade having thin copper plate is about 105 dB, whereas that of the saw blade of the present invention is less than 100 dB.

Also, the manufacturing process of the present invention is simple and able to be easily automated to reduce manufacturing cost of the blade. Also, since a drop in adhesive force of the resin adhesive sheet layer of the invention is generated above 300° C., the resin adhesive sheet layer 14 of the saw blade 10 of the invention can maintain excellent adhesive force as a whole without occurring thermal damages thereon even though heat is generated by operating of the saw blade 10, or a cutting tip is adhered to the wheel body 11 by means of welding which is partially carried out.

As apparent from the foregoing description, it can be appreciated that the present invention provides an adhesive sheet having excellent noise and shock absorption effects and manufacturing methods therefor for use in joining components of a cutting or grinding apparatus to generate vibrations and noises such as a cutting saw machine, including a noise and shock absorption material to reduce noises and absorb shocks or vibrations.

Also, the present invention provides a saw blade and manufacturing methods therefor for use in a cutting or grinding apparatus which is able to reduce noises and absorb shocks or vibrations generated between the saw blade and the material to be cut during cutting or grinding operation and thereby to enhance cutting ability and life of the blade, and whose manufacturing process is able to be easily automated to reduce manufacturing cost of the blade.

What is claimed is:

1. A saw blade for cutting or grinding workpieces, comprising:
   a wheel body for cutting or grinding the workpieces, the wheel body having at least two wheel portions and a plurality of slot holes around the periphery thereof with predetermined intervals;
   at least one adhesive sheet layer for adhering said wheel portions of the wheel body, wherein the adhesive sheet layer is positioned between each of the wheel portions of the wheel body and covers substantially the entire surfaces of said wheel portions, and including at least one resin selected from the group consisting of denaturalized epoxy resin, phenol resin and rubber; and a noise and shock absorption material of non-woven fabric.

2. The saw blade as claimed in claim 1, wherein said noise and shock absorption material has thickness of 0.01~1.0 mm.

3. A saw blade for cutting or grinding workpieces, comprising:
   a wheel body for cutting or grinding the workpieces, the wheel body having at least two wheel portions and a plurality of slot holes around the periphery thereof with predetermined intervals;
   at least one adhesive sheet layer for adhering said wheel portions of the wheel body, wherein the adhesive sheet layer is positioned between each of the wheel portions of the wheel body and covers substantially the entire surfaces of said wheel portions, and including at least one resin selected from the group consisting of denaturalized epoxy resin, phenol resin and rubber; and a noise and shock absorption material composed of paper.

4. The saw blade as claimed in claim 3, wherein said noise and shock absorption material has a thickness of 0.01~1.0 mm.

5. A saw blade for cutting or grinding workpieces, comprising:
   a wheel body for cutting or grinding the workpieces, the wheel body having at least two wheel portions and a plurality of slot holes around the periphery thereof with predetermined intervals;

at least one adhesive sheet layer for adhering said wheel portions of the wheel body, wherein the adhesive sheet layer is positioned between each of the wheel portions of the wheel body and covers substantially the entire surfaces of said wheel portions, and including at least one resin selected from the group consisting of denaturalized epoxy resin, phenol resin and rubber; and a noise and shock absorption material composed of textile.

6. The saw blade as claimed in claim 5, wherein said noise and shock absorption material has a thickness of 0.01~1.0 mm.

* * * * *